United States Patent [19]

Goldstein

[11] 4,269,644
[45] May 26, 1981

[54] COLD RECAPPING METHOD FOR TIRES

[75] Inventor: Leon C. Goldstein, Atlanta, Ga.

[73] Assignee: Prior Tire Enterprises Inc., Atlanta, Ga.

[21] Appl. No.: 102,960

[22] Filed: Dec. 12, 1979

Related U.S. Application Data

[63] Continuation-in-part of Ser. No. 859,239, Dec. 9, 1977, abandoned.

[51] Int. Cl.³ .......................................... B29H 17/36
[52] U.S. Cl. .................................... 156/96; 156/286; 264/326; 425/18
[58] Field of Search .................... 156/96, 126–129, 156/285–287, 381, 382, 394; 425/17, 18; 23/290, 291; 264/36, 315, 316, 326

[56] References Cited

U.S. PATENT DOCUMENTS

| | | | |
|---|---|---|---|
| 3,236,709 | 2/1966 | Carver | 156/128 R |
| 3,325,326 | 6/1967 | Schelkmann | 156/96 |
| 3,752,726 | 8/1973 | Barefoot | 156/96 |
| 3,769,121 | 10/1973 | Martin | 156/96 |
| 3,884,739 | 5/1975 | Hindin et al. | 156/96 |
| 3,917,440 | 11/1975 | Huebert | 425/18 |
| 3,989,428 | 11/1976 | Cox | 425/18 |
| 4,090,901 | 5/1978 | Baatz | 156/96 |
| 4,115,171 | 9/1978 | Dundon | 156/96 |

Primary Examiner—John E. Kittle
Attorney, Agent, or Firm—Schuyler, Banner, Birch, McKie & Beckett

[57] ABSTRACT

A cold recapping method using a rubber bonding composition on each of a group of tires and a precured tread strip wrapped around each tire has each tire mounted on a rim and enclosed in a flexible curing envelope which extends radially inwardly over the sidewalls of the tire. The group of tires is assembled in side by side relationship with the envelopes held between the sidewalls of adjacent tires. End plates with resilient elements are applied over the exposed outer wall of the tire, at least at each end of the group whereupon each tire in the group is inflated to a low pressure to achieve the normal shape of each tire, the group on the holding mandrel is introduced into a heating chamber, the space between each tire and the envelope enclosing such tire is vented to atmosphere, each tire is inflated to a relatively high pressure so that the tires in the group press the radially inwardly extending portions of adjacent envelopes tightly together and against the adjacent tire sidewalls while the group is firmly retained together by the holding mandrel under axial pressure controlled by the resilient elements and the chamber interior is heated to a temperature less than 212° and pressurized to a pressure somewhat lower than the high pressure within each tire.

4 Claims, 6 Drawing Figures

COLD RECAPPING METHOD FOR TIRES

RELATED APPLICATIONS

This is a continuation-in-part of application Ser. No. 859,239, filed Dec. 9, 1977, now abandoned.

BACKGROUND OF THE INVENTION

1. Field of the Invention

The invention relates generally to an improved method for retreading the running surface of vehicle tires and more particularly to a novel method for applying a prevulcanized tread strip directly to a tire casing by cold vulcanization for the purpose of replacing such tread as may have been previously worn off in use or otherwise removed from the tire.

2. Description of the Prior Art

Heretofore, various methods have been employed for retreading vehicle tires. Commonly, worn tires are recapped by the warm vulcanization method, wherein an uncured thread cover of "camel-back" is applied to the buffed crown surface of the previously cured tire casing or carcass and the assembly is vulcanized at an elevated temperature in a suitable mold. A major disadvantage of this type of retread resides in the finished or vulcanized tread surface which is relatively microporous and will quickly wear off in use, thereby materially reducing the service-life of the retreaded tire. This is primarily due to the fact that the uncured "camel-back" cannot be subjected to an extremely high molding pressure while being vulcanized to the tire casing. Any deformation or distortion of the tire casing during the curing operation will tend to subsequently rupture or materially weaken the vulcanized bond between the cured "camel-back" and the crown surface of the tire after it is removed from the vulcanizing mold. In addition, the elevated vulcanizing temperature tends to weaken and deteriorate the previously cured tire casing.

More recently, attempts have been made to apply a prevulcanized tread strip to a previously cured tire casing by "cold" vulcanization. The prevulcanized tread strip is bonded directly to the tire casing by means of a bonding material without subjecting the tire casing to an elevated vulcanizing temperature which would tend to weaken and deteriorate the previously cured tire casing. In addition, since the tread strip is vulcanized before being applied to the tire casing, considerably increased vulcanization pressures may be employed which result in a retread surface having improved strength and density and which will tend to resist normal road abrasion. A retread having such a prevulcanized tread strip uniformly and securely bonded thereto will accordingly have a greatly increased service-life. In the past, efforts to bond a prevulcanized strip to a tire casing have not cured the tire to its normal inflated radius resulting in inferior tire mileage. Earlier methods involve slow loading of single tires into a chamber thereby allowing the chamber to cool down. Other methods do not allow a visual inspection of an inflated assembly outside of the curing station to determine if the envelope containing the assembled unit has no leaks and will sustain a vacuum. The failure of prior art methods to effect a satisfactory uniform bond between the prevulcanized tread strip and the tire casing has generally been due to two factors. First, deformation and shrinkage of the tire casing due to the application of pressure thereto during the bonding operation, and, second, the entrapment of air between the tread strip and the tire casing that is not forced out during the curing.

SUMMARY OF THE INVENTION

The method involves cold tire recapping utilizing a precured tread strip and a rubber bonding composition between the strip and the prepared tire carcass. A flexible envelope encloses each of a group of tires which have bonding composition and a precured tread strip thereon. Each tire is inflated to a low pressure for the tire to assume its normal shape. The group of tires are placed in side-by-side relation and held by a mandrel extending through the center of the group of tires to hold the tires and prevent them from separating within the group. A resilient element on the mandrel controls the axial pressure to maintain the proper pressure between the tires, the envelopes and the end plates. Thereafter, the tires while held in the group are placed within a heating chamber. The space between the envelope and tire is vented to atmospheric pressure. Each tire in the group is inflated to a relatively high pressure while the tires are held in side-by-side relation in the groups. The heating chamber is pressurized to a somewhat lower pressure than the pressure within each tire and the chamber is heated interiorly to a temperature approaching, but not higher than 212° to cure the rubber bonding composition between the precured tread strip and the tire carcass.

A principal object of the present invention relates to a novel method of uniformly bonding a prevulcanized tread strip to a tire casing.

A further object of this invention relates to a novel method of uniformly bonding a prevulcanized tread strip to a tire casing without deformation and shrinkage of the tire casing and with removal of entrapped air between the tire casing and the tread strip.

Other objects and the entire scope of the present invention will become apparent from the following detailed description reference to the accompanying drawings. It should be understood, however, that the detailed description and specific examples while indicating preferred embodiments of the invention, are given by way of illustration only, since various changes and modifications within the spirit and scope of the invention will become apparent as the description herein progresses. Reference is now made to the accompanying drawings which form a part hereof, wherein like numerals refer to like parts thoughout and in which:

DESCRIPTION OF THE PREFERRED EMBODIMENT

Figure 1:
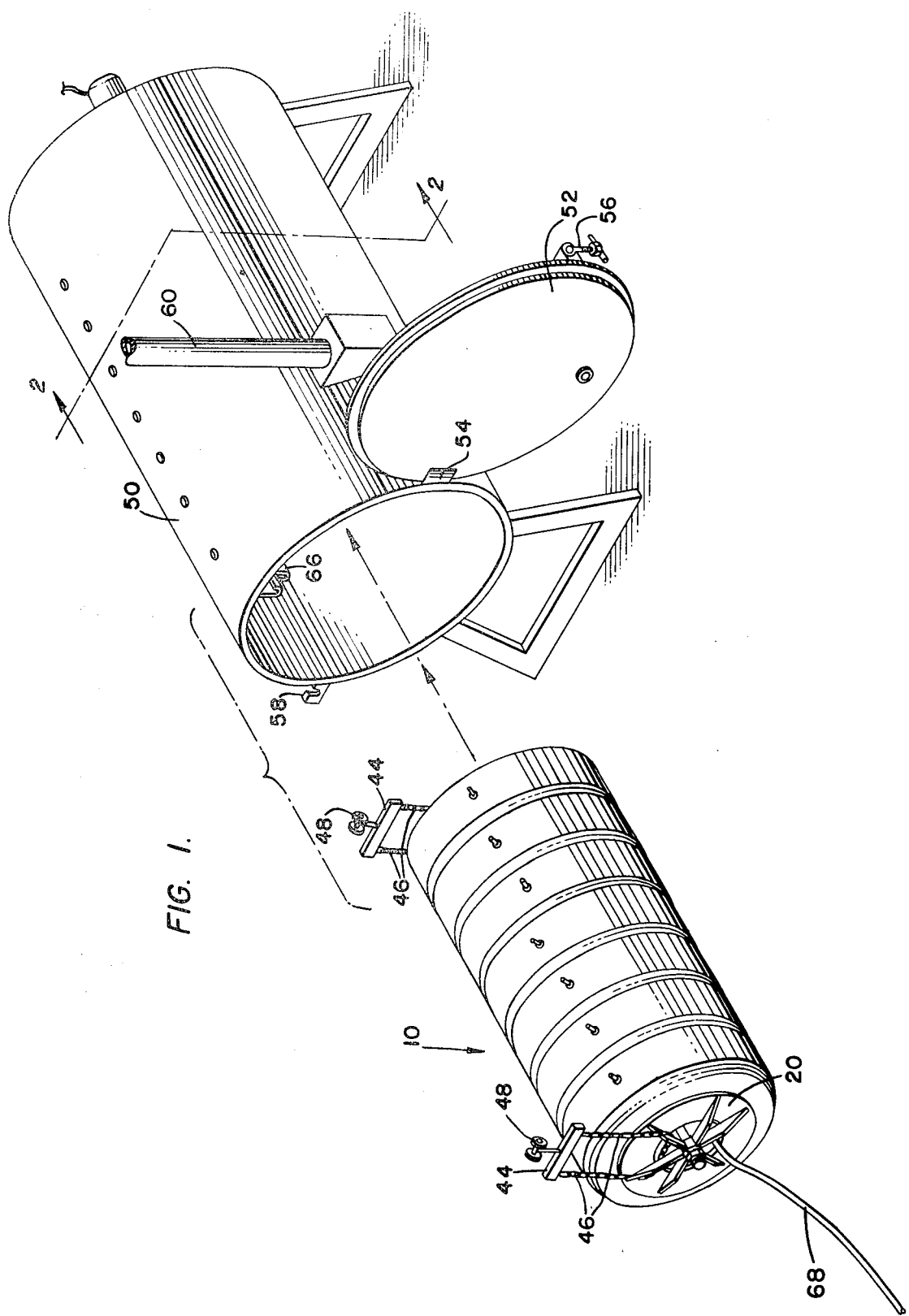
FIG. 1 is a perspective view showing the heating chamber with a group of tires prepared for introduction thereinto.
Figure 2:
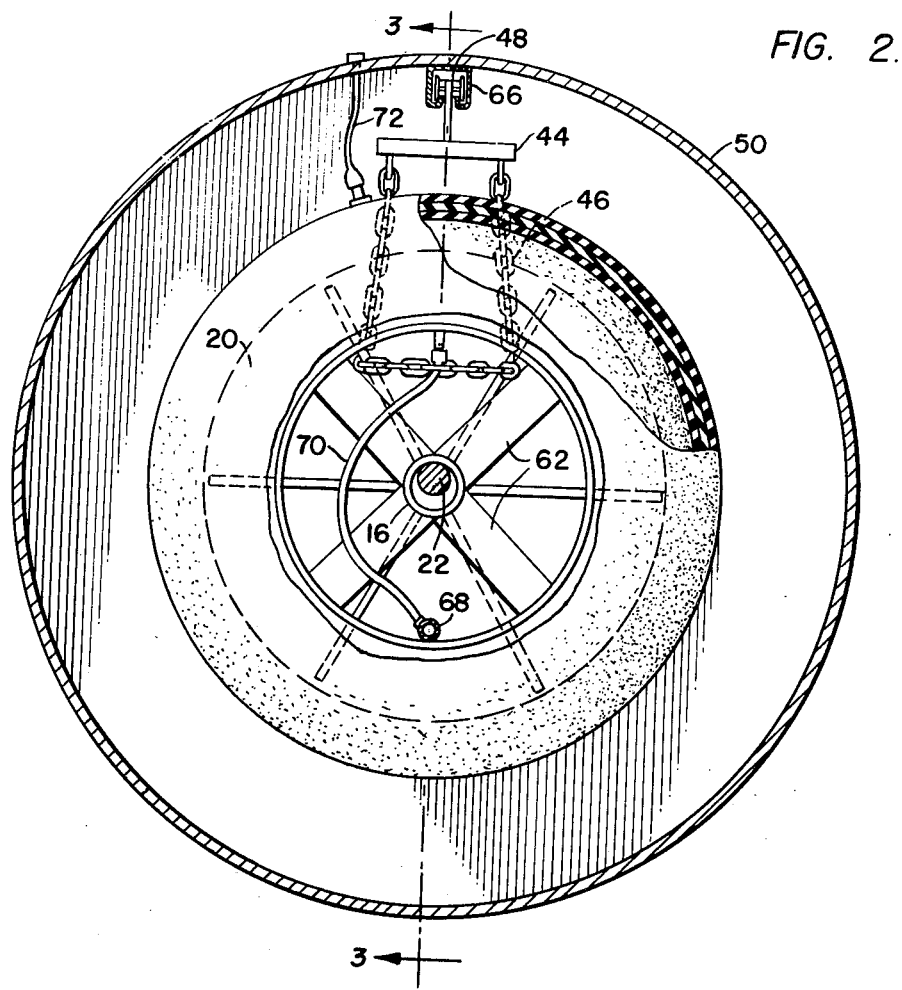
FIG. 2 is a sectional view taken on line 2—2 of FIG. 1 with the group of tires suspended in the chamber.
Figure 5:
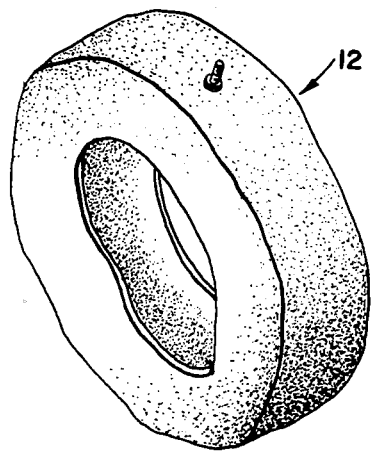
FIG. 5 is a perspective view of one of the envelopes which encloses each tire.
Figure 3:
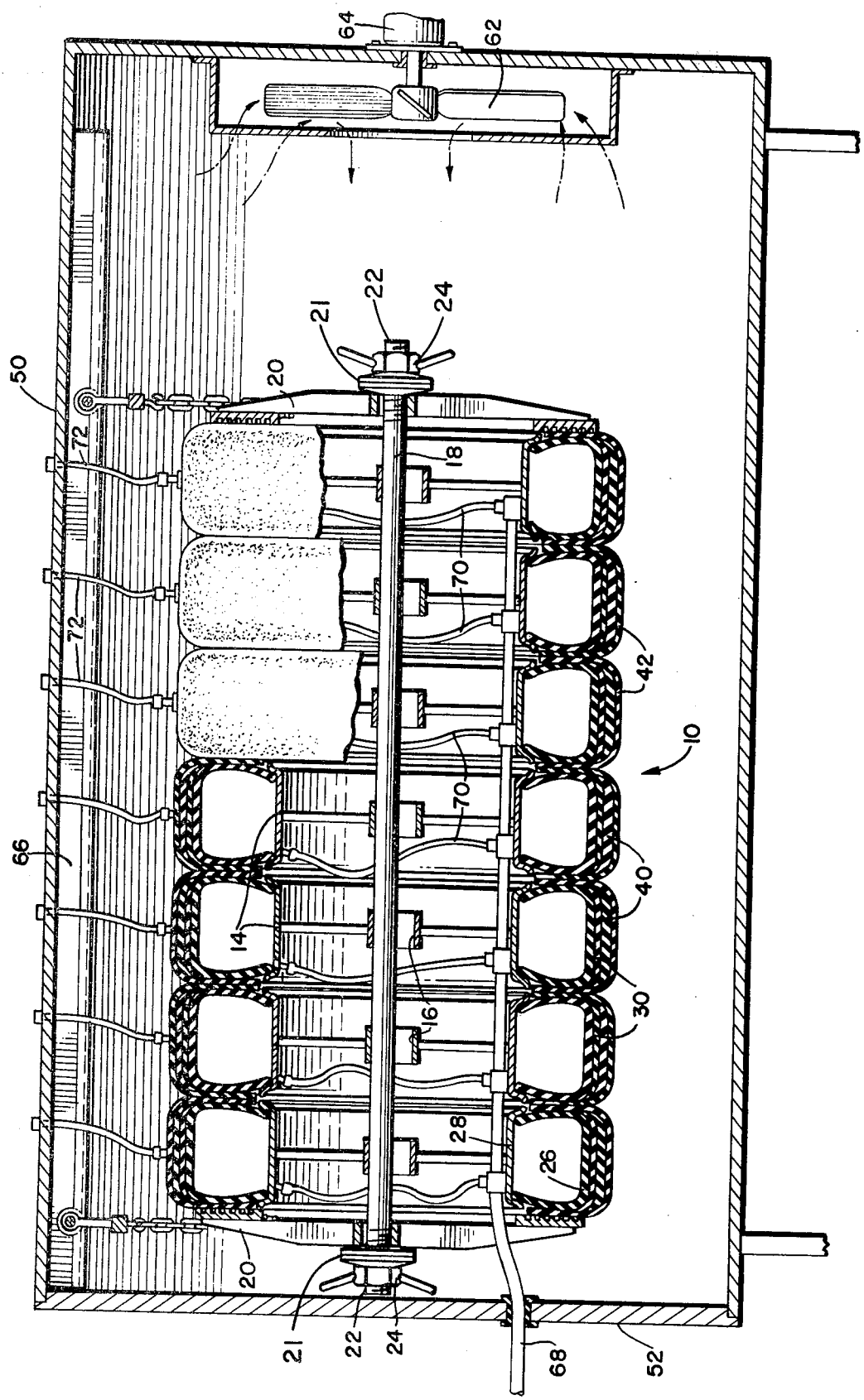
FIG. 3 is a sectional view taken on line 3—3 of FIG. 2, showing several of the tires in section.
Figure 6:
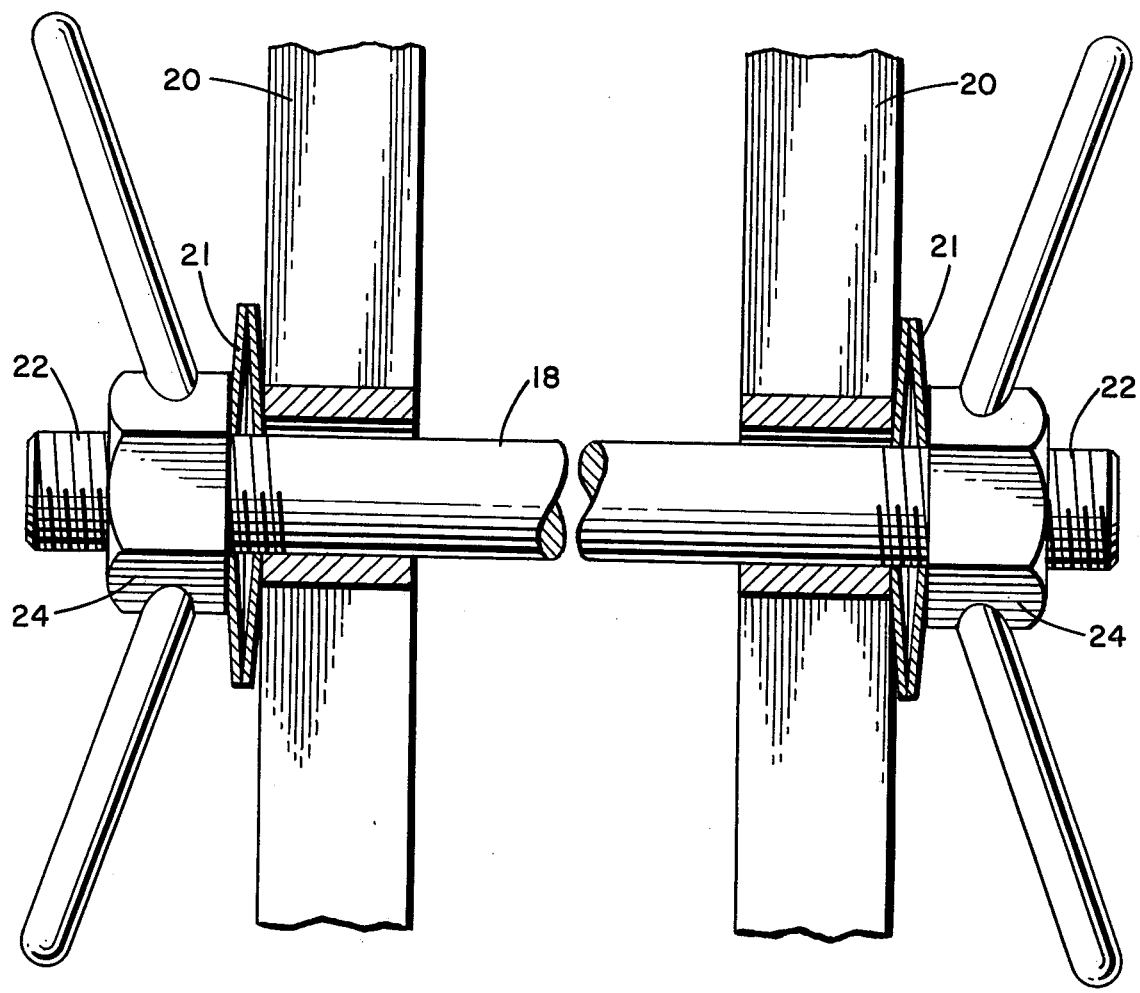
FIG. 6 is a partial sectional view on an enlarged scale showing the resilient elements retaining the tires on the mandrel.

The invention involves an improvement on techniques used heretofore. In accordance with the invention, a group of tires are mounted on rims with each tire being enclosed in an envelope such as shown in FIG. 5. The tires are inflated to a low pressure in the order of about 20 pounds per square inch so that the tire will assume its normal shape. The group of tires are assembled in side-by-side relationship and a mandrel passed through the tires. A holding plate is placed at each end of a group of tires where the tires are of similar diameter, a resilient element is placed on the mandrel and a nut threaded onto the mandrel at each end to clamp the tires through the resilient elements in the fashion shown in FIGS. 3, 5 and 6. Where the tires are of reasonably the same size or of the same size as shown in FIGS. 1 and 3, an end plate at each end is sufficient for the complete group of tires. If tires of substantially differing size are to be assembled in a group, a separate plate will be assembled between each set of similarly sized tires within the different sets of differently sized tires. Thus, one set of similarly sized tires would have a plate at each end of the set of tires. Also, smaller tire sizes will go into the front of the heating chamber. The group of tires with or without different sets of sizes would have a plate at each end as shown in FIG. 3 and would be inflated to a relatively high pressure of 100 to 115 pounds per square inch once the assembly of the group is placed in the heating chamber.

Figure 4:
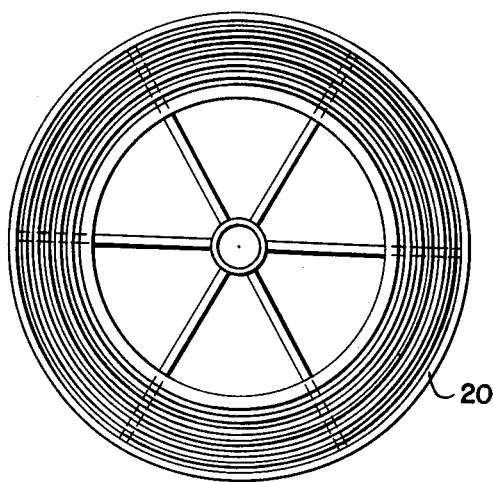
FIG. 4 is an elevational view of one of the end plates used with the mandrel to clamp the group of tires together.

Referring to the drawings, each of the seven tires illustrated in the group 10 shown on FIG. 1 is enclosed in an envelope 12 as shown in FIG. 5. These tires are assembled in side-by-side relation as shown in FIGS. 1 and 3, with each tire being mounted on a quick detachable rim 14. This rim has a center hub 16. A mandrel 18 passes through the hubs 16 of the group of tires 10.

Where the group of tires 10 are of similar size each end of the group, as shown in FIGS. 3 and 4, will have an end plate 20. Preferably, this end plate is circumferentially grooved as shown in FIGS. 3 and 4 to distribute the pressure within the group of tires. Belleville springs, or resilient elements 21, are placed on the mandrel to engage each end plate 20.

The mandrel 18 retains the group of tires in side-by-side condition by having threaded ends 22 and nuts 24 threaded onto the ends of the mandrel 18, outside of the end plates 20 and the resilient elements 21. Each tire is then mounted on a quick detachable rim 28. Each of the tires in the group 10 is originally inflated to a pressure in the order of about 20 pounds per square inch to place the tire 26 in its normal configuration, and to allow the operator to pull a vacuum on the envelope to ascertain that it has a secure seal. The tire 26 has a rubber bonding composition 30 on the prepared outer surface of the carcass and a precured tread strip 40 overlying the bonding composition. Each tire in the group of tires 10 has a flexible envelope 42 enclosing the tire carcass with the bonding composition and precured tread strip thereon.

With the group of ties 10 assembled as shown in FIGS. 1 and 3 and nuts 24 on the mandrel 18 tightened down to hold them together, the group 10 is supported on hangers 44 by chains 46 which connect to the spokes of the plates 20. Each hanger 44 has a trolley 48.

The trolley 48 serves to support the group of tires when they are moved into the heating chamber 50 which has a hinged door 52 hinged at 54 and which can be appropriately held shut by dog 56 engaging with cleat 58 on the front of chamber 50.

Chamber 50 may be appropriately heated by electrical heating units (not shown) to achieve a curing temperature approaching, but not higher than 212 degrees Fahrenheit. Additionally, pressure in the order of 85 pounds per square inch will be applied internally in the chamber 50 and the chamber may be exhausted through outlet 60 shown on FIG. 1. A circulating fan 62 driven by motor 64 operates to maintain a uniform temperature within the interior of the heating chamber 50. A trolley rail 66 runs along the longitudinal top of the chamber 50 and the front and rear trolleys 48 supporting the group of tires 10 are engaged with this rail to move the group of tires 10 into the heating chamber.

Once within the chamber, each tire is connected by means of a manifold 68 through individual connectors 70 to be inflated to a pressure between 100 and 115 pounds per square inch. This high pressure above the original 20 pounds per square inch expands the tires into close contact with each other while they are firmly held on the mandrel 18 by axial pressure controlled by the resilient elements 21 so the tires in the assembled group achieve their normal shape which is maintained by the pressure contributed by the resilient elements 21. The sidewalls of the group of tires press the radially inwardly extending portions of the flexible envelope 42 to seal the envelopes against each tire by the expansion of the tires in the group. Each tire 26 has the space between the envelope and the tire vented to atmospheric pressure by a separate individual tire vent 72 leading to atmospheric pressure outside the heating chamber 50.

With the tires in each group inflated to 100 to 115 pounds per square inch, the space between the flexible envelope 42 and the tire 26 vented to atmospheric pressure, the interior of the chamber 50 is pressurized to about 85 pounds per square inch and the electric heater energized to raise the chamber temperature up to 212° Fahrenheit. By restricting the temperature to 212° Fahrenheit, moisture in the tires does not expand as steam and cause separations in the tire.

Resilient elements such as Belleville springs 21 on the mandrel 18 control the axial pressure exerted by end plates 20 on the tires. Once nuts 24 are tightened, the Belleville springs maintain a substantially constant axial pressure. Even when the tires are inflated to 100 to 115 pounds per square inch, Belleville springs 21 maintain the proper axial pressure on the end plates, the tires and the envelopes. If this axial pressure is too great, there is transverse crowning of the tire tread where the center of the tread expands outwardly. This will result in excessive wear on the tread center when the tire is in use and cause the tread to pull away from the carcass. If the axial pressure is too light, the seals between contiguous envelopes are incomplete.

While the foregoing constitutes a detailed description of a preferred embodiment of a method and application of the invention, it is to be recognized that it will be obvious to those skilled in the art that changes and modification may be made without departing from the invention. Accordingly, the scope of the invention is to be limited solely by the scope of the appended claims.

I claim:

1. A cold tire recapping method utilizing a precured tread strip and a rubber bonding composition between the strip and the prepared tire carcass comprising the steps of:

enclosing a flexible envelope around each of a group of tires which have bonding composition and a precured tread strip thereon;

inflating each tire of said group to a low pressure to assume the tire's normal shape within the envelope;

assembling said group of tires with their axes of rotation substantially aligned so that sidewalls of adjacent tires within said group sealingly press contiguous walls of envelopes thereon toward each other;

applying a controlled axial pressure against the ends of the assembled group to establish a sealed relationship between adjacent tire sidewalls and envelopes within said group;

holding the assembled group so the tires will not move to break this sealed relationship of adjacent tire sidewalls and envelopes within said group;

placing the tires while held in said group within a heating chamber;

venting the space between the envelope and tire of each tire in said group to atmospheric pressure;

inflating each tire to a relatively high pressure while continuing to hold the tires and envelopes in sealed relation in said group and while maintaining a substantially constant axial pressure on the tires to avoid excess outward expansion at the center of the tread of each tire;

pressurizing the chamber to a pressure somewhat lower than the pressure within each tire; and heating the interior of the chamber to a temperature not exceeding 212° F. to cure the rubber bonding composition between the precured tread strip and the tire carcass.

2. A cold tire recapping method as recited in claim 1 wherein holding said group of tires comprises the steps of pressing an end plate against the opposite ends of said group of tires, retaining the end plates against the opposite ends of said group of tires by drawing the plates toward one another through the axes of rotation of said group of tires, and distributing the holding pressure over discrete spaced areas pressing against the opposite ends of said group of tires.

3. A cold tire recapping method as recited in claim 1 wherein said relatively high pressure is between 100 to 115 pounds per square inch.

4. A cold tire recapping method as recited in claim 1 wherein said low pressure is in the order of about 20 pounds per square inch, said high pressure is between 100 and 115 pound per square inch, and said chamber pressure is about 85 pounds per square inch.

* * * * *